(12) United States Patent
Delbridge et al.

(10) Patent No.: US 12,511,473 B2
(45) Date of Patent: Dec. 30, 2025

(54) AUTOMATED OPTIMIZATION OF ELECTRONIC FORMS

(71) Applicant: Klaviyo, Inc, Boston, MA (US)

(72) Inventors: Ian T. Delbridge, Boston, MA (US);
Thomas Dinitz, Pasadena, CA (US);
Uday Kolluri, Boston, MA (US);
Charles Rickarby, Portland, MA (US);
Nikita Shenkman, Boston, MA (US)

(73) Assignee: Klaviyo, Inc, Boston, MA (US)

( * ) Notice: Subject to any disclaimer, the term of this patent is extended or adjusted under 35 U.S.C. 154(b) by 185 days.

(21) Appl. No.: 18/383,945

(22) Filed: Oct. 26, 2023

(65) Prior Publication Data

US 2025/0139356 A1    May 1, 2025

(51) Int. Cl.
*G06F 40/186* (2020.01)
(52) U.S. Cl.
CPC .................................. *G06F 40/186* (2020.01)
(58) Field of Classification Search
CPC .............................. G06F 40/186; G06F 40/174
See application file for complete search history.

(56) References Cited

U.S. PATENT DOCUMENTS

| 6,519,571 | B1 | 2/2003 | Guheen et al. |
| 7,130,808 | B1 | 10/2006 | Ranka et al. |
| 7,213,202 | B1 | 5/2007 | Kagle |
| 7,257,772 | B1 | 8/2007 | Jones et al. |
| 7,287,218 | B1 | 10/2007 | Knotz et al. |
| 7,533,090 | B2 | 5/2009 | Agarwal et al. |
| 7,752,607 | B2 | 7/2010 | Larab et al. |
| 7,761,524 | B2 | 7/2010 | Carmel et al. |
| 7,845,950 | B2 | 12/2010 | Driscoll et al. |
| 7,975,000 | B2 | 7/2011 | Dixon et al. |
| 7,975,223 | B2 | 7/2011 | Plumley et al. |
| 8,117,267 | B2 | 2/2012 | Gardner et al. |
| 8,224,905 | B2 | 7/2012 | Bocharov et al. |

(Continued)

FOREIGN PATENT DOCUMENTS

| EP | 4174577 A1 | 5/2023 |
| WO | 2010138512 A1 | 12/2010 |

OTHER PUBLICATIONS

U.S. Appl. No. 18/383,945, filed Oct. 26, 2023.

(Continued)

*Primary Examiner* — Hope C Sheffield
(74) *Attorney, Agent, or Firm* — Brian R. Short

(57) ABSTRACT

Apparatuses, methods, and systems for automated form generation are disclosed. One method includes receiving a request from a user to improve a user-provided form, selecting one or more automatically generated variations of the user-provided form, wherein the variations include at least a different content or a different behavior, testing the forms, comprising generating estimates of success rates of each of the forms, comprising adaptively selecting which of the forms to communicate to each of a plurality of sub-users during the testing based on previous interactions of the sub-users during past communication of the forms, identifying most successful of the forms based on sensed sub-user actions, focusing the testing on the most successful of the user-provided form and the generated variations of the user-provided form, and completing the testing based on a criteria.

20 Claims, 7 Drawing Sheets

(56) References Cited

U.S. PATENT DOCUMENTS

| | | |
|---|---|---|
| 8,250,470 B2 | 8/2012 | Takashima |
| 8,341,224 B2 | 12/2012 | Kasetty et al. |
| 8,434,002 B1 | 4/2013 | Shah et al. |
| 8,484,156 B2 | 7/2013 | Hancsarik et al. |
| 9,237,233 B2 | 1/2016 | Soundar |
| 9,319,297 B2 | 4/2016 | Aurisset |
| 9,356,889 B2 | 5/2016 | Caskey et al. |
| 9,430,454 B2 | 8/2016 | Newman et al. |
| 9,485,640 B2 | 11/2016 | Bowers et al. |
| 10,248,657 B2 | 4/2019 | Prahlad et al. |
| 10,313,387 B1* | 6/2019 | Kras ............... H04L 63/1433 |
| 10,331,775 B2 | 6/2019 | Ryan et al. |
| 10,438,230 B2 | 10/2019 | Moran et al. |
| 10,503,912 B1 | 12/2019 | Kerr |
| 10,701,005 B2 | 6/2020 | Nutt et al. |
| 10,817,663 B2 | 10/2020 | Weald et al. |
| 11,475,207 B2 | 10/2022 | Xie et al. |
| 11,483,272 B2 | 10/2022 | Klink et al. |
| 11,488,204 B2 | 11/2022 | Pisupati et al. |
| 11,734,724 B1 | 8/2023 | Kingman, Jr. et al. |
| 11,769,171 B1 | 9/2023 | Huang |
| 11,783,122 B1 | 10/2023 | Lawson et al. |
| 11,783,643 B1 | 10/2023 | Khiabani et al. |
| 11,847,106 B2 | 12/2023 | Urdiales et al. |
| 11,880,650 B1 | 1/2024 | Li et al. |
| 12,387,236 B2 | 8/2025 | Delbridge |
| 2002/0004745 A1 | 1/2002 | Bascobert et al. |
| 2004/0006598 A1 | 1/2004 | Bargagli Damm et al. |
| 2005/0273705 A1 | 12/2005 | McCain |
| 2006/0162071 A1 | 7/2006 | Dixon et al. |
| 2006/0168024 A1 | 7/2006 | Mehr et al. |
| 2006/0225040 A1 | 10/2006 | Waddington |
| 2007/0100805 A1 | 5/2007 | Ramer et al. |
| 2007/0271392 A1* | 11/2007 | Khopkar ............... G06Q 30/02 709/245 |
| 2008/0144813 A1 | 6/2008 | Furukawa |
| 2008/0178073 A1 | 7/2008 | Gao et al. |
| 2008/0189156 A1 | 8/2008 | Voda et al. |
| 2008/0215692 A1 | 9/2008 | Bosarge et al. |
| 2008/0275980 A1* | 11/2008 | Hansen ............... G06Q 30/02 709/224 |
| 2009/0006936 A1 | 1/2009 | Parker et al. |
| 2009/0018996 A1 | 1/2009 | Hunt et al. |
| 2009/0037546 A1 | 2/2009 | Kirsch |
| 2009/0089131 A1 | 4/2009 | Moukas et al. |
| 2009/0125518 A1 | 5/2009 | Bailor et al. |
| 2009/0132459 A1 | 5/2009 | Hicks |
| 2009/0222296 A1 | 9/2009 | Wagner et al. |
| 2010/0049534 A1 | 2/2010 | Whitnah et al. |
| 2010/0268661 A1 | 10/2010 | Levy et al. |
| 2010/0281074 A1 | 11/2010 | Bailor et al. |
| 2011/0078246 A1 | 3/2011 | Dittmer-Roche |
| 2011/0270710 A1 | 11/2011 | Nash |
| 2011/0307331 A1 | 12/2011 | Richard et al. |
| 2012/0042239 A1 | 2/2012 | O'Brien |
| 2012/0191546 A1 | 7/2012 | Phelan et al. |
| 2012/0233554 A1 | 9/2012 | Vagell et al. |
| 2012/0294514 A1 | 11/2012 | Saunders et al. |
| 2013/0066665 A1 | 3/2013 | Tamhane et al. |
| 2013/0080243 A1 | 3/2013 | Dias |
| 2013/0124956 A1 | 5/2013 | Hatfield et al. |
| 2013/0185311 A1 | 7/2013 | MacMillan et al. |
| 2014/0019443 A1 | 1/2014 | Golshan |
| 2014/0025608 A1* | 1/2014 | Miller ............... G06N 20/20 706/12 |
| 2014/0033101 A1 | 1/2014 | Rein et al. |
| 2014/0100964 A1 | 4/2014 | Kramer et al. |
| 2014/0189714 A1* | 7/2014 | Lawbaugh ............... H04L 67/00 719/313 |
| 2014/0278747 A1 | 9/2014 | Gumm |
| 2014/0282125 A1 | 9/2014 | Duneau |
| 2014/0344013 A1 | 11/2014 | Karty et al. |
| 2014/0378071 A1 | 12/2014 | Acosta |
| 2015/0019662 A1 | 1/2015 | O'Kane et al. |
| 2015/0058428 A1 | 2/2015 | Caskey et al. |
| 2015/0170213 A1 | 6/2015 | O'Malley |
| 2015/0220577 A1 | 8/2015 | Sengupta et al. |
| 2015/0227962 A1 | 8/2015 | Wical et al. |
| 2015/0294349 A1 | 10/2015 | Capel et al. |
| 2015/0347925 A1 | 12/2015 | Zeng et al. |
| 2016/0070717 A1 | 3/2016 | Bergner et al. |
| 2016/0117717 A1 | 4/2016 | Moreau et al. |
| 2016/0132472 A1 | 5/2016 | Campbell et al. |
| 2016/0162929 A1 | 6/2016 | Takiela et al. |
| 2016/0189176 A1 | 6/2016 | Newnham et al. |
| 2017/0019697 A1 | 1/2017 | Hundemer |
| 2017/0178193 A1 | 6/2017 | Jagannath et al. |
| 2017/0221109 A1 | 8/2017 | Liu et al. |
| 2018/0053199 A1 | 2/2018 | Mathis et al. |
| 2018/0081868 A1 | 3/2018 | Willcock et al. |
| 2018/0082326 A1 | 3/2018 | Vlassis et al. |
| 2018/0108029 A1 | 4/2018 | Sinha et al. |
| 2018/0225027 A1 | 8/2018 | Cooke et al. |
| 2018/0293502 A1 | 10/2018 | Sengupta et al. |
| 2018/0341873 A1 | 11/2018 | Fellows |
| 2019/0121827 A1 | 4/2019 | Boswell et al. |
| 2019/0122254 A1 | 4/2019 | Duquette et al. |
| 2019/0130333 A1 | 5/2019 | Li et al. |
| 2019/0197092 A1 | 6/2019 | Thiesen et al. |
| 2019/0228063 A1 | 7/2019 | El-Sherif et al. |
| 2019/0259041 A1 | 8/2019 | Jackson |
| 2019/0311301 A1 | 10/2019 | Pyati |
| 2020/0104340 A1 | 4/2020 | Liu et al. |
| 2020/0226640 A1 | 7/2020 | Kakarlapudi et al. |
| 2020/0319996 A1 | 10/2020 | Mordo et al. |
| 2020/0327577 A1 | 10/2020 | Truong et al. |
| 2020/0342500 A1* | 10/2020 | Kulkarni ............ G06Q 30/0277 |
| 2020/0356624 A1 | 11/2020 | Cai et al. |
| 2020/0357012 A1 | 11/2020 | Kendall et al. |
| 2020/0394455 A1 | 12/2020 | Lee et al. |
| 2021/0004422 A1 | 1/2021 | Sun et al. |
| 2021/0042830 A1 | 2/2021 | Burke |
| 2021/0109897 A1 | 4/2021 | Brechbuhl et al. |
| 2021/0133287 A1 | 5/2021 | Ayloo |
| 2021/0133852 A1 | 5/2021 | Vauthey et al. |
| 2021/0157974 A1 | 5/2021 | Xie et al. |
| 2021/0184999 A1 | 6/2021 | Klink et al. |
| 2021/0294978 A1 | 9/2021 | Chhaya et al. |
| 2021/0357952 A1 | 11/2021 | Liu et al. |
| 2021/0389962 A1 | 12/2021 | Li |
| 2022/0036311 A1 | 2/2022 | Didrickson et al. |
| 2022/0113853 A1 | 4/2022 | Nostrini et al. |
| 2022/0188740 A1 | 6/2022 | Nazarali et al. |
| 2022/0283932 A1 | 9/2022 | Arbour et al. |
| 2022/0405783 A1 | 12/2022 | Kondamudi et al. |
| 2022/0405784 A1 | 12/2022 | Kondamudi et al. |
| 2022/0414325 A1 | 12/2022 | Bhatnagar et al. |
| 2022/0414686 A1 | 12/2022 | Lawson et al. |
| 2022/0414696 A1 | 12/2022 | Kondamudi et al. |
| 2022/0414705 A1 | 12/2022 | Jain et al. |
| 2023/0033753 A1 | 2/2023 | Wang et al. |
| 2023/0186342 A1 | 6/2023 | Ding et al. |
| 2023/0298368 A1 | 9/2023 | Berger et al. |
| 2023/0316186 A1 | 10/2023 | Miller et al. |
| 2023/0409821 A1 | 12/2023 | Lawson et al. |
| 2023/0413020 A1 | 12/2023 | Lawson et al. |
| 2024/0005365 A1 | 1/2024 | Chen et al. |
| 2024/0054539 A1 | 2/2024 | Ekfeldt et al. |
| 2024/0250922 A1 | 7/2024 | Natoli et al. |
| 2024/0281822 A1 | 8/2024 | Austin et al. |
| 2024/0394746 A1 | 11/2024 | Delbridge |
| 2025/0238839 A1 | 7/2025 | Blanchard et al. |

OTHER PUBLICATIONS

11 Best Drag and Drop Word Press Page Builder Plugins, by Anna Fitzgerald, Nov. 13, 2020, pp. 1-21; https://blog.hubspot.com/website/top-5-free-drag-and-drop-wordpress-page-builder-plugins (Year: 2020).

A nonparametric Bayesian analysis of heterogeneous treatment effects in digital experimentation, Matt Taddy, Matt Gardner, Liyun Chen, David Draper, University of California, Santa Cruz, Dec. 18, 2015.

(56) References Cited

OTHER PUBLICATIONS

Cali, Sedef, et al. "A Bayesian based Approach for Analyzing Customer's Online Sales Data to Identify Weights of Product Attributes." Expert Systems with Applications, vol. 210, Aug. 9, 2022. (Year: 2022).

Frigui, Hichem, et al. "Unsupervised Clustering and Feature Weighting based on Generalized Dirichlet Mixture Modeling." Sience Direct: Information Sciences 274, pp. 35-54. Mar. 27, 2014. (Year: 2014).

Kamalbasha, Shafi, et al. "Bayesian A/B Testing for Business Decisions." Data Science: Analytics and Applications, p. 50-57. Mar. 5, 2020. (Year: 2020).

Kobayashi, Takumi. "Dirichlet-Based Histogram Feature Transform for Image Classification." National Institute of Advanced Industrial Science and Technology, CVPR 2014. (Year: 2014).

Lindholm (A 3-way Merging Algorithm for Synchronizing Ordered Trees-the 3DM merging and differencing tool for XML, published Sep. 2001, pp. 1-205) (Year: 2001).

Lindholm (A Three-way Merge for XML Documents, published Oct. 2004, pp. 1-10) (Year: 2004).

Lindholm (XML Three-way Merge as a Reconciliation Engine for Mobile Data, published Sep. 2003, pp. 1-5) (Year: 2003).

Miller, Alex, et al. "An Empirical Meta-analysis of E-Commerce A/B Testing Strategies." The Wharton School, University of Pennsylvania, 2020. (Year: 2020).

Paulo et al., Leveraging email marketing: Using the subject line to anticipate the open rate, Expert Systems with Applications, vol. 207, 2022, 117974.

The Bayesian Bootstrap, A short guide to a simple and powerful extension of the bootstrap, Matteo Courthoud, published in the Towards Data Science, Aug. 8, 2022.

The Bayesian Bootstrap, Donald B. Rubin, The Annals of Statistics, 1981, vol. 9, No. 1, 130-134.

WordPress Editor: Working With Blocks »Blocks, Jan. 1, 2021, pp. 1-6; https://wordpress.com/supporUwordpress-editor/blocks/ (Year: 2021).

Y. Yamamoto et al., "IoT-aware online shopping system enhanced with gaze analysis," 2016 World Automation Congress (WAC), Rio Grande, PR, USA, 2016, pp. 1-6, doi: 10.1109/WAC.2016.7583028.

U.S. Appl. No. 18/957,272, filed Nov. 22, 2024.

Hao, Yaru, et al. "Language models are general-purpose interfaces." arXiv preprint arXiv:2206.06336 (2022). (Year: 2022).

Iachello, G. et al. (2005). Control, Deception, and Communication: Evaluating the Deployment of a Location-Enhanced Messaging Service. In: Beigl, M., Intille, S., Rekimoto, J., Tokuda, H. (eds) UbiComp 2005: Ubiquitous Computing. UbiComp 2005. Lecture Notes in Computer Science, vol. 3660. (Year: 2005).

ILC-CMAS Model, summary of research findings and implication for Content Creation and Management Automation System (CMAS), Choo Wou Onn; Halimah Badioze Zaman;Chue Wen Yeen, 2008 International Symposium on Information Technology, Year: 2008 | Conference Paper | Publisher: IEEE. (Year: 2008).

VWO, A/B Testing Guide, 2023 (Year: 2023).

Zhang, Rui, and Joel Tetreault. "This email could save your life: Introducing the task of email subject line generation." arXiv preprint arXiv: 1906.03497 (2019). (Year: 2019).

\* cited by examiner

AUTOMATED OPTIMIZATION OF ELECTRONIC FORMS

FIELD OF THE DESCRIBED EMBODIMENTS

The described embodiments relate generally to intelligent electronic networking. More particularly, the described embodiments relate to systems, methods and apparatuses for automated optimization of electronic forms.

BACKGROUND

Different forms can have different levels of success when provided to the website visitor (customer).

It is desirable to have methods, apparatuses, and systems for automated optimization of electronic forms.

SUMMARY

An embodiment includes a computer-implemented method of automated form generation. The method includes receiving, by a server, a request from a user improve a user-provided form, and receiving data associated with the user-provided form, selecting, by the server, one or more automatically generated variations of the user-provided form, wherein the variations include at least a different content or a different behavior, testing, by the server, the user provided form and the one or more automatically generated variations of the form, comprising generating estimates of success rates of each of the user-provided form and the one or more automatically generated variation of the form, comprising adaptively selecting, by the server, which of the user-provided form and the one or more automatically generated variations of the user-provided form to communicate to each of a plurality of sub-users during the testing including identifying, by the server, most successful of the user-provided form and the one or more automatically generated variations of the user-provided form based on sensed sub-user actions upon receiving the user-provided form and the one or more automatically generated variations of the user-provided form, and focusing the testing on the most successful of the user-provided form and the one or more automatically generated variations of the user-provided form, and completing the testing based on a criteria. The test results of each of the user-provided form and the one or more automatically generated variations of the user-provided form are compiled.

Another embodiment includes a system for automated form generation. The system includes a site manager configured to manage a website of a user, a plurality of computing devices of a plurality of sub-users configured to visit the website, and a server electronically connected to the site manager, and the plurality of computing devices. The server being configured to receive a request from the user to improve a user-provided form, and receiving data associated with the user-provided form, select one or more automatically generated variations of the user-provided form, wherein the variations include at least a different content or a different behavior, and test the user provided form and the one or more automatically generated variations of the form, including generating estimates of success rates of each of the user-provided form and the one or more automatically generated variation of the form, including adaptively selecting which of the user-provided form and the one or more automatically generated variations of the user-provided form to communicate to each of the plurality of sub-users during the testing including identifying most successful of the user-provided form and the one or more automatically generated variations of the user-provided form based on sensed sub-user actions upon receiving the user-provided form and the one or more automatically generated variations of the user-provided form, focusing the testing on the most successful of the user-provided form and the one or more automatically generated variations of the user-provided form, and completing the testing based on a criteria. The server being further operative to compile test results of each of the user-provided form and the one or more automatically generated variations of the user-provided form.

Other aspects and advantages of the described embodiments will become apparent from the following detailed description, taken in conjunction with the accompanying drawings, illustrating by way of example the principles of the described embodiments.

DETAILED DESCRIPTION

The embodiments described include methods, apparatuses, and systems for automated optimization of electronic forms. For at least some embodiments, the automated optimization includes orchestration of testing of electronic forms. For an embodiment, the automated orchestration includes an end-to-end process that includes one or more tests of a user-provided form against automatically generated form variations. For an embodiment, the test, testing, or experiment refers to one stage of the process. For an embodiment, different behaviors of the forms are tested against each other. For an embodiment, the success of each of the forms is determined by sensing actions of sub-users (recipients) upon receiving each of the different forms having the different behaviors. For an embodiment, one or more of the forms is selected for future electronic communication to the sub-users based on the determined success of each of the forms. Accordingly, the automatic optimization of the forms is determined by sensing, measuring, and/or monitoring actions of the sub-users during testing of different forms. For an embodiment, the display of selected form(s) is determined by the testing which includes sensing, measuring, and/or monitoring actions of the sub-users during testing.

Figure 1:
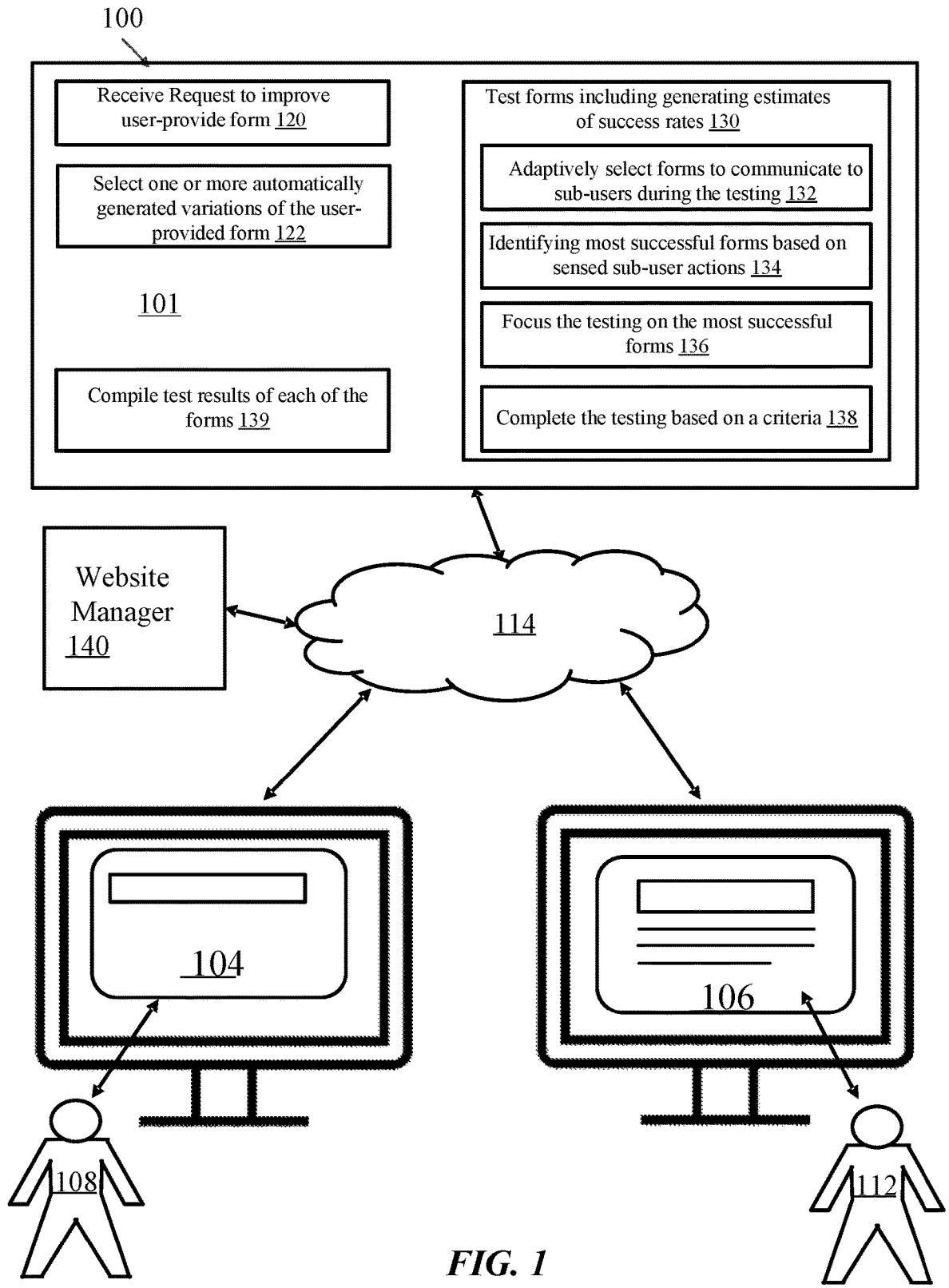
FIG. 1 shows a system for automated form generation, according to an embodiment.

FIG. 1 shows a system 100 for automated form generation, according to an embodiment. The system 100 includes a server 101. For an embodiment, the server 101 is electronically connected through a network 114 to electronic devices 104, 106 of site visitors (sub-users) 108, 112. For an embodiment, the server 101 operates to receive 120 a request from a user of a website manager 140 to improve a user-provided form, and receive data associated with the user-provided form. For an embodiment, the data associated with the user-provided form includes a data structure describing a form template of the user-provided form including content and/or behavior. For an embodiment, the data associated with the user-provided form includes measurements of performance and form usage prior to requesting optimization of the user-provided form. For an embodiment, the data associated with the user-provided form includes configurations of the optimization to be run. For an embodiment, the configurations include conditions for ending the optimization and definitions of acceptable behavior (for example, maximum time delay).

The website manager 140 operates and manages a website (such as an ecommerce website). For an embodiment, the website manager 140 includes a server of a business that operates to directly control the ecommerce website. For an embodiment, the website manager 140 includes a combination of the business and a third party to operate to control the ecommerce website. For an embodiment, the website manager 140 is a customer of the operator of the server 101. For an embodiment, the website manager 140 is a combination of the customer of the operator of the server 101 and a third party (such as a Shopify platform).

For an embodiment, the server 101 further operates to select 122 one or more automatically generated variations of the user-provided form, wherein the variations include at least a different content or a different behavior. For an embodiment, a static list of commonly used forms or rules to trigger generation of variations of the user-provided form. For an embodiment, a predefined set of variations of the user-provided form are determined. An embodiment includes programmatically determining variations for a subset of forms (based on content or behavior). An embodiment includes model-generated variations of the user-provide form (that is, using models from other form optimizations). For an embodiment, the model includes the "model of sub-user actions" 515 of FIG. 5, but for previously run optimizations on the same or different user-provided forms. For an embodiment, the model is constructed from the data observed in many previously run optimizations across multiple forms, users, and/or accounts. An embodiment includes user-defined variations of the user-provided form.

For an embodiment, each of the forms (the user provided form and the variations of the user-provided form) are defined by templates including a set of data objects that combine to represent a structure of a form. As described, the variations of the form each have a different content or behavior. Accordingly, the set of data objects of each of the templates combine to represent a structure of forms having a different content and/or behavior. The structure of a form includes the content and the behavior. For an embodiment, the templates additional include information pertaining to testing of the form(s). For an embodiment, the additional information includes, for example, a test name, a description of the test (makes it easier to remember what is being tested), an ending date, and/or specific settings that correspond to statistical significance criteria. For an embodiment, the additional information pertaining to the testing combined with the data for the templates define a test.

For an embodiment, the server 101 operates to test 130 user-provided form and the one or more automatically generated variations of the user-provided form, including generating estimates of success rates of each of the user-provided form and the one or more automatically generated variation of the form. For an embodiment, the testing includes adaptively selecting 132, by the server, which of the user-provided form and the one or more automatically generated variations of the user-provided form to communicate to each of a plurality of sub-users during the testing. For an embodiment, the adaptively selecting 132, by the server, includes electronically sending the user-provided form and the one or more automatically generated variations of the user-provided form to the sub-users, sensing actions of the sub-users and identifying 134 most successful of the user-provided form and the one or more automatically generated variations of the user-provided form based on the sensed sub-user actions upon receiving the user-provided form and the one or more automatically generated variations of the user-provided form, and focusing 136 the testing on the most successful of the user-provided form and the one or more automatically generated variations of the user-provided form.

For at least some embodiments, the adaptively selecting 132, by the server, which of the user-provided form and the one or more automatically generated variations of the user-provided form to communicate to each of a plurality of sub-users during the testing is based on previous interactions of the sub-users during past communication of the user-provided form and the one or more automatically generated variations of the user-provided form. That is, the testing includes sensing/monitoring actions of the sub-users as the sub-users receive the user-provided form and the variations of the user-provided forms. The monitored actions of the recipient sub-users are used to establish the success of each of the forms. For an embodiment, initially (that is, before the testing begins) the variations of the forms are randomly selected. However, as the testing proceeds, as described, for an embodiment, the adaptive selection of the forms is based on the successes of the variations of the forms as determined by actions of the website visitors or recipients of the forms.

For an embodiment, sub-users who receive the forms (the user-provided form or the variations of the user-provided form) are qualified. That is, only qualified sub-users receive the forms during testing. For an embodiment, prior actions by the sub-users are used to qualify the sub-users. The prior actions can be sensed and stored for future qualification determinations.

As stated, for an embodiment, the testing includes identifying 134 most successful of the user-provided form and the one or more automatically generated variations of the user-provided form based on sensed sub-user actions upon receiving the user-provided form and the one or more automatically generated variations of the user-provided form. That is, recipients receive the variations of the form. Some variations of the form will be more successful than other variations of the forms as determined by actions of the recipients upon being displayed the variations of the forms. As described, the recipient actions may include filling out a received variation of the form, or some other action that the form is intended to solicit.

For at least some embodiments, the sensed/monitored actions of the recipients (sub-users) determine the estimated success of each of the different forms. That is, for an embodiment, sensed action of sub-users based on receiving (having displayed) the different forms are used to determine the success rate of each of the different forms. For an embodiment, the success rate determines the estimated success of each form.

As stated, at least some embodiment includes focusing 136 the testing on the most successful of the user-provided form and the one or more automatically generated variations of the user-provided form. That is, as the testing progresses, the selection of the forms for additional testing adaptively changes based on the success or lack of success of the forms previously tested. As described, for an embodiment, success of a form is determined by sensed actions of the recipient (sub-user) of the form.

At least some embodiments include completing 138 the testing based on a criteria. For an embodiment, the identifying 134 the most successful of the user-provided form and the one or more automatically generated variations of the user-provided form and focusing 136 the testing on the most successful of the user-provided form and the one or more automatically generated variations of the user-provided form are repeated until the selected criteria has occurred or been satisfied. For an embodiment, the selected criteria include a selected number of variations of the user-provided form to be tested. That is, after testing the selected number of variations of the user-provided form, the testing is determined to be complete. For an embodiment, the criteria include an elapsed amount of time. That is, after testing for the elapsed amount of time, the testing is determined to be complete.

For an embodiment, the server 101 compiles test results of each of the user-provided form and the one or more automatically generated variations of the user-provided form. For an embodiment, the compiling includes identifying the forms (of the user provided form and the variations of the user-provided form) that resulted in the highest likelihood of a sub-user performing an action based on receiving (being displayed) the forms. As previously stated, for an embodiment, the action is sensed and correlated with the displaying of the form to the sub-user.

Qualified Sub-Users

For an embodiment, only sub-users that have been qualified are provided with the forms (the user-provided form and the variations of the user-provided form). That is, the sub-users are qualified based on having performed an action (such as visiting a website of the user or purchasing a product in the past) or some other criteria. For an embodiment, only qualified sub-users are selected for receiving the user-provided form and the variations of the user-provided form. For at least some embodiments, the site visitor (sub-user) is qualified and shown (displayed on customer website) a form for at least one of multiple reasons, such as a geolocation (wherein the geolocation can be determined by sensing the location of the sub-user) of the site visitor, defined user behavior characteristics of the site visitor (for example, the site visitor has purchased from the site within the last 7 days), or a page URL (except amount of time spent on the page or amount of page scrolled or exit intent). A usage of the qualification for views (that is, the testing between different forms having a different behavior, such as, a time delay) may include a test between a template with a 5 second delay from moment of page load to moment that form appears and a template with a 10 second delay from moment of page load to moment that form appears, wherein there are no other differences between the templates. This usage of the qualification for views is a template (A/B) test which is used for qualification of views to make sure that the success rates being compared are valid. For an embodiment, the delay may be selected by the website manager 140.

For an embodiment, the success rate is defined as the number of successes divided by the number of qualified views. That is, for an embodiment, the number of people (site visitors) who are qualified to view the form is used as the denominator in the success rate equation to correctly account for different intent in the actual viewers. For an embodiment, the success rate or success metric of a form (of the user provided form and the variations of the user-provided form) indicates a probability of a sub-user taking a desired action upon receiving the form. For an embodiment, identifying the most successful of the user-provided form and the one or more automatically generated variations of the user-provided form includes determining the success rate of success metric of each form. For an embodiment, the success probability includes a rate that includes a numerator and denominator. For an embodiment, the numerator is the number of sub-users that perform the desired action (specifically submitting the form or any other sensed action of the sub-user upon being displayed the form), and the denominator is the number of users that are qualified to be shown the form as previously described.

Views

For at least some embodiments, views are the number of site visitors (the customers of the website manager 140) to whom the form appears in the browser of the site visitor. That is, site visitor's geolocation, defined user behavior characteristic (for example, the site visitor has purchased from the site within the last 7 days), the page URL, and targeting characteristics such as any combination of time delay (amount of time from page load when form appears), scroll delay (amount of the page scrolled from the top until form appears), and exit intent behavior (moving the cursor outside of the window for the page) match the qualifications.

At least some embodiments further include determining that a conversion rate is similar with conversion rates of forms, as opposed to other parts of the website. That is, for an embodiment, the form is displayed on the website. Portions of the website may solicit an input from the site visitor. However, for an embodiment, the applied analysis method is optimized for conversion rates similar with conversion rates of those seen in forms. For example, for a Bayesian prior that is constructed using historical forms data. For an embodiment, this is specific to the expected data setting for an individual form, using factors such as success rates on forms with similar behavior and design, success rates on forms from the same site or similar sites, or patterns of traffic on the page the form appears.

Figure 2:
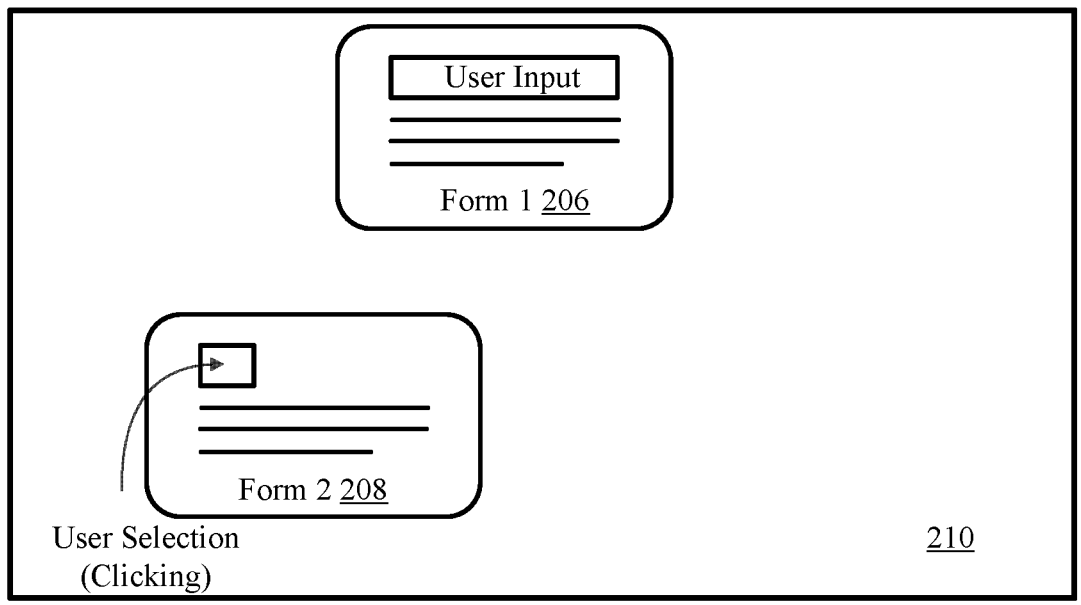
FIG. 2 shows forms that require an input, according to an embodiment.
Figure 2:
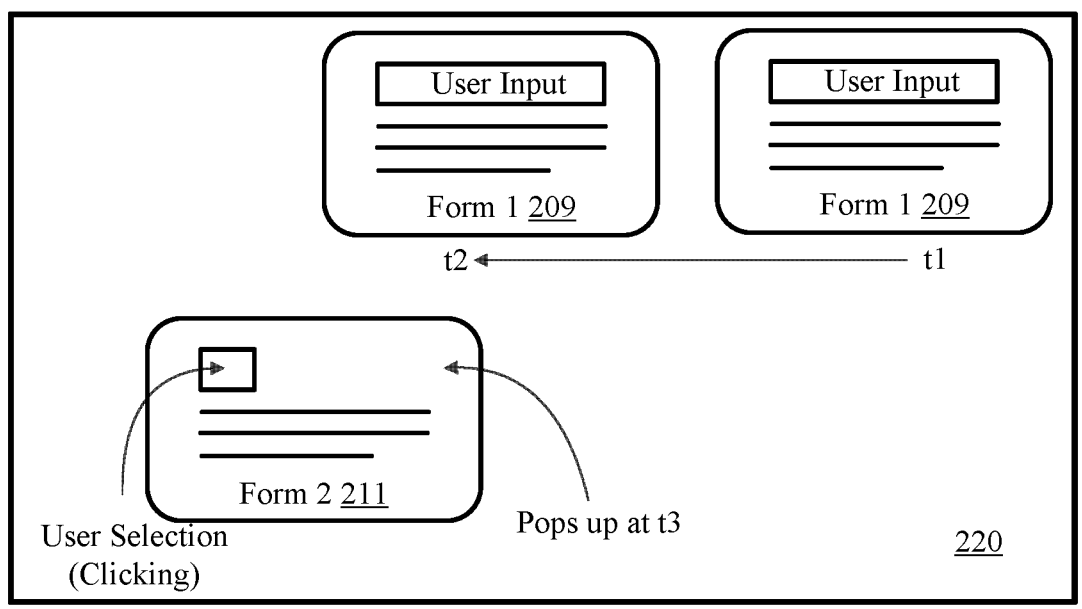

FIG. 2 shows forms that require an input, according to an embodiment. A first website display 210 includes a form 206 that requires an input from a user (site visitor), and a form 208 that requires a user input through, for example, a selection, such as, through a mouse click. A second website display 220 includes a form 209 that changes positions on the display between times t1 and t2, and a form 211 that "pops up" a time t3 after the webpage has been loaded. Clearly, other forms having different content and behavior can be utilized. For an embodiment, the form 290 that changes position and the form 211 that pops up can be more generally described as forms that have a behavior that includes the display of the form changing over time.

As previously described, the sensed/monitored actions of the recipients (sub-users) determine the estimated success of each of the different forms. For an embodiment, the estimated success of each of the variations of the form is used to determine the selection of the variations of the forms to be tested, and eventually to determine the winning forms that are to be used by the user to send to sub-users after completion of the testing. That is, the sensed/monitored actions of the sub-users ultimately determine the winning forms to be utilized by the user. This can include, for example, the selection of the timing of the changing position of the form 209 or the popup time t3 of the form 209. For an embodiment, the popup time is a form delay which is a delay between when a sub-user performs an action on a website of the user and when the sub-user is displayed a form.

For at least some embodiments, the behaviors of the different forms include different scroll percentages, wherein the scroll percentage includes an amount that sub-users need to scroll down the page to receive the form. For an embodiment, the behaviors of the different forms include different exit intents, wherein an exit intent includes a sub-user moving their cursor to a corner of the window as if to move away from the user's website. For an embodiment, the behaviors of the different forms include different positions of the forms. For an embodiment, the behaviors of the different forms include different movements of the forms. For an embodiment, the behaviors of the different forms include different sizes of the forms. For an embodiment, the behaviors of the different forms include different layouts of the forms. For an embodiment, the contents of the different forms include different calls to actions, different tones of the message of the forms, different offer (discount) amounts or type (for instance, free shipping vs 5% off).

As described, for an embodiment, the different behaviors and/or content of the user-provided form and the variations of the user-provided form are used for the testing, which is then used to select one or more of the user-provided form or the variations of the user-provided form to utilize after the testing. Accordingly, the sensed actions of the sub-users during the testing of the user-provided form and the variations of the user-provided form are used for selecting the behavior and/or content of forms provided to the sub-users after completion of the testing.

For an embodiment, the form includes a file configured to receive an input from a site visitor. For an embodiment, the required input includes at least one or more of the sub-user (site visitor) clicking to a different page, or the customer entering information. For an embodiment, the form is distinct from an underlying website which may include a dynamic and interactive page. For an embodiment, the forms are distinct from the underlying website because the forms appear visually and/or behaviorally distinct from the underlying page. For example, the behavior of the form may include the form popping up after the page is loaded or sliding out from the side after the rest of the page has been loaded.

Figure 3:
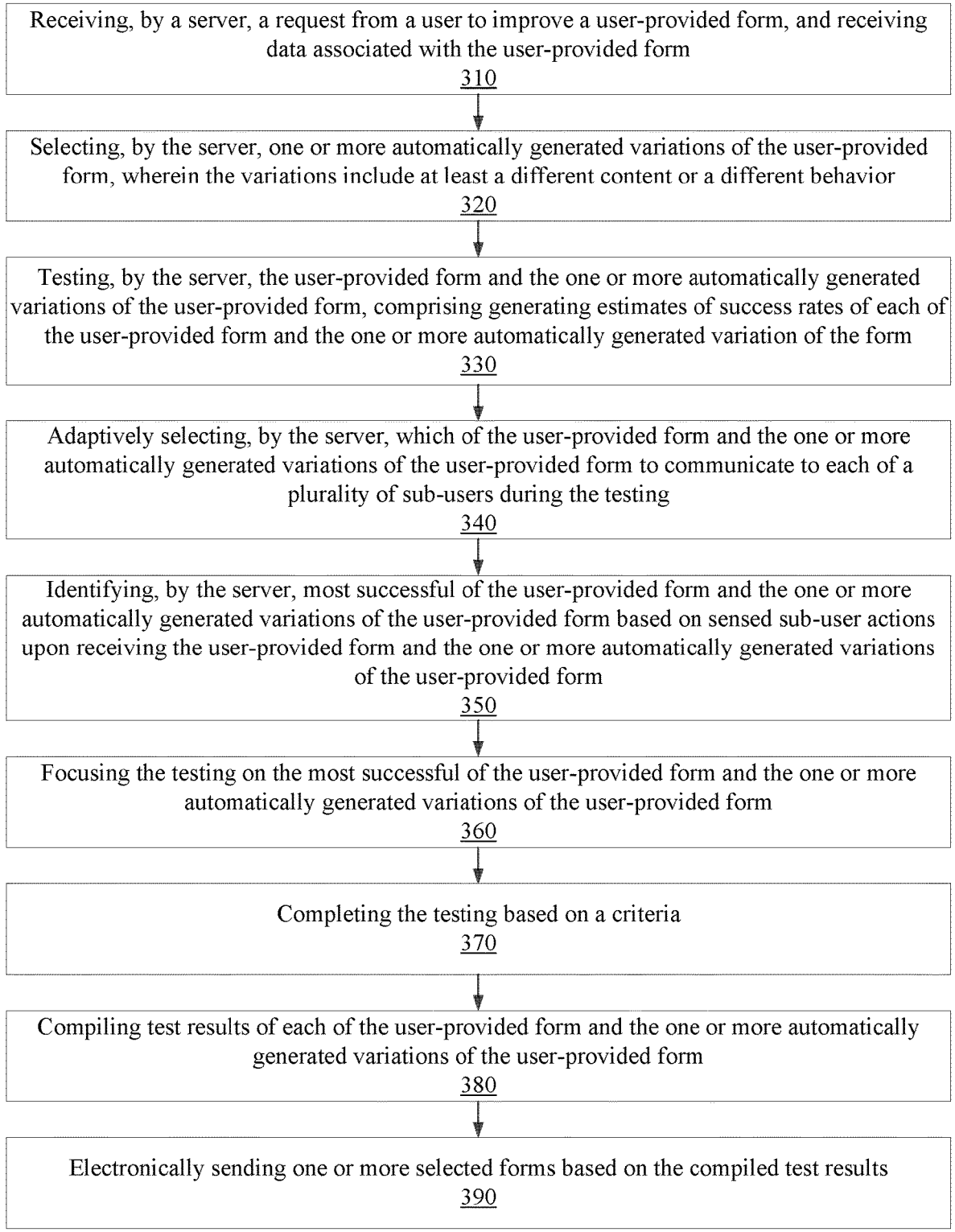
FIG. 3 is a flow chart that includes steps of a method for automated form generation, according to an embodiment.

FIG. 3 is a flow chart that includes steps of a method for automated form generation, according to an embodiment. A first step 310 includes receiving, by a server, a request from a user (merchant) to improve a user-provided form, and receiving data associated with the user-provided form. For an embodiment, improvement includes a recipient of the form being more likely to perform an action solicited by the form, such as, filling out and electronically returning the form.

Automatically Generated Variations of User-Provided Form

A second step 320 includes selecting, by the server, one or more automatically generated variations of the user-provided form, wherein the variations include at least a different content or a different behavior. For at least some embodiments, automatically generated variations of the user-provided form include a static list of commonly used forms or rules to trigger generation of variations of forms. For an embodiment, a predefined set of variations of forms are selected. For an embodiment, variations of the user-provided form are programmatically determined using commonly used variations for a subset of forms (based on content or behavior). For an embodiment, variations of the user-provided form are model-generated (that is, using models from other form optimizations). For an embodiment, variations of the user-provided form include user-defined variations.

As described, the user-provided form and the one or more automatically generated variations of the user-provided form each include a different content or behavior. As described, the content and behaviors of the forms vary. The testing includes determining which content and behavior is the most successful based on actions of the recipients of the forms, which is then used to select/manipulate the content and behavior as shown and described with FIG. 2.

Testing of Forms

A third step 330 includes testing, by the server, the user-provided form and the one or more automatically generated variations of the form, comprising generating estimates of success rates of each of the user-provided forms and the one or more automatically generated variation of the form. For an embodiment, the testing includes a fourth step 340, including adaptively selecting, by the server, which of the user-provided form and the one or more automatically generated variations of the user-provided form to communicate to each of a plurality of sub-users during the testing. For an embodiment, the adaptively selecting of the fourth step 340 includes a fifth step 350 and a sixth step 360 which include identifying the most successful of the forms being tested and focusing the testing on the most successful forms being tested.

As described, for an embodiment, the adaptively selecting of the fourth step 340 is based on previous interactions of the sub-users during past communication of the user-provided form and the one or more automatically generated variations of the user-provided form. That is, the testing dynamically selects the forms to be tested based on the testing results. That is, for example, the forms that are tested to be more successful may be selected at a greater rate than less successful forms. For an embodiment, the initial selection before any testing of the forms has occurred, the selection is random. For an embodiment, the initial selection may include a weighting based on the results of previous testing. However, as stated, for an embodiment, the selection is based on the success of prior variations of the forms as determined by actions of a website visitor or form recipient.

Identifying Success of the Forms

For an embodiment, the fifth step 350 of the testing includes identifying, by the server, most successful of the user-provided form and the one or more automatically generated variations of the user-provided form based on sensed sub-user actions upon receiving the user-provided form and the one or more automatically generated variations of the user-provided form. That is, recipients receive the variations of the form. Some variations of the form will be more successful than other variations of the forms as determined by actions of the recipients of the variations of the forms. As described, the recipient actions may include filling out a received variation of the form, or some other action that the form is intended to solicit. For an embodiment, the sensed sub-user action includes a lack of a sensed action within a period of time. For an embodiment, the lack of sensed action includes a lack of action or behavior of the sub-user's device (such as the sub-user's browser blocking popup forms, or improper display of a form if popup forms are being blocked. For an embodiment, a popup form is a form that appears in the middle the screen (display) of the sub-user demanding the attention of the user, and completely prevents the user from using the rest of the website until the form has been completed or dismissed. For an embodiment, a flyout form is the colloquial name of a form that similarly appears on the website (display), but slides in from the outskirts of the screen and stays there, allowing usage of the website while the form is displayed.

Focusing Testing of Forms

For an embodiment, the sixth step 360 includes focusing the testing on the most successful of the user-provided form and the one or more automatically generated variations of the user-provided form. That is, as described, for an embodiment, the prior selections are focused on the most successful forms. Further, as the testing progresses, the most successful of the user-provided form and the one or more automatically generated variations of the user-provided form adaptively change over time as sub-user actions are sensed.

Testing Completion Criteria

A seventh step 370 includes completing or ceasing the testing based on a criteria which is selected. For an embodiment, the identifying 134 most successful of the user-provided form and the one or more automatically generated variations of the user-provided form and focusing 136 the testing on the most successful of the user-provided form and the one or more automatically generated variations of the user-provided form are repeated until the selected criteria has occurred or been satisfied. For an embodiment, the selected criteria include a selected number of variations of the user-provide form to be tested. That is, after testing the selected number of variations of the user-provided form, the testing is determined to be complete. For an embodiment, the criteria include an elapsed amount of time. That is, after testing for the elapsed amount of time, the testing is determined to be complete. For an embodiment, the criteria include the testing of a number of repetitions of the chosen variations. That is, a number of variations are chosen, and after a selected number of repetitions of the chosen variation of the number of variations, the testing is determined to be complete. For an embodiment, the criteria include a model metric, such as an estimated probability that the testing has reached an optimal point. For an embodiment, the criteria include heuristics, such as, a slowing of testing performance. That is, a rate of change is the success determination of the variations of the form may stop changing, or changes less than a threshold amount over time. For an embodiment, the criteria include model metrics, like its estimated probability that a point is optimal.

An eighth step 380 includes compiling test results of each of the user-provided form and the one or more automatically generated variations of the user-provided form. For an embodiment, this includes compiling estimates of success rates of each of the user-provided form and the one or more automatically generated variations of the user-provided form. For an embodiment, the compiled test results include a ranking of the success of the testing of the user-provided form and the one or more automatically generated variations of the user-provided form.

A ninth step 390 includes electronically sending one or more selected forms of the user-provided form and the one or more automatically generated variations of the user-provided form to sub-users based on the compiled estimates of the success rates. That is, once the most successful variations of the user-provided form are determined, those variations may then be communicated to the sub-users.

As described, at least some embodiments further include providing the test results of (the describe embodiments for testing of steps 360, 370, 380) of the user-provided form and the one or more automatically generated variations to a model. Further, the model generates new variations of the user-provided form which are included in the testing. At least some embodiments include not just the initial testing phase of the user-provided form and (several) generated variations but also the phases afterwards that use the model (which is based on the initial generated variations and any other variations tested thus far) to generate the variations to test.

Sensing Actions of Sub-Users

For an embodiment, the sensed sub-user actions upon receiving the user-provided form and the one or more automatically generated variations of the user-provided form includes sensing selection by the sub-users at least portions of the user-provided form and the one or more automatically generated variations of the user-provided form. That is, upon receiving the user-provided form or the variation of the user-provided form, the sub-user may ignore the form(s) or the user may select at least a portion of the form. For an embodiment, the sensed sub-user actions include sensing whether or not the sub-user recipient of the form(s) selects at least the portion of the form.

For an embodiment, the sensed sub-user actions upon receiving the user-provided form and the one or more automatically generated variations of the user-provided form includes sensing the recipient sub-users filling out the form (s). For an embodiment, when the sub-user loads a webpage, user-tracking code is loaded in through a JavaScript bundle and utilized within the browser of the sub-user. For an embodiment, actions of the sub-user on the website of the user can be tracked. Further, a mobile device of a sub-user can be tracked to determine other possible actions of the sub-user. For an embodiment, forms that have been filled out and submitted to the website of the user can be monitored and tracked. For an embodiment, behavior of the sub-user's internet browser or device (that would affect communication of a message or a sub-user's desired action) can be monitored or tracked. For an embodiment, navigation by the sub-user to a website or URL (universal resource locator) can be sensed, tracked, and monitored.

For an embodiment, the user-tracking code can utilize sensors on the computing device of the sub-user to track actions of the computing device. For example, the computing device may be a mobile device that includes motion and location sensors that can identify actions of the sub-user that can be correlated with the sub-user having received a displayed form. Further, actions of multiple sub-users can be sensed to determine correlations between different sub-users who have received the forms.

For an embodiment, the sensed sub-user actions based on receiving the user-provided form and the one or more automatically generated variations of the user-provided form includes sensing the sub-users sending an SMS message for subscribing to an SMS list of the user. That is, the action of sensing the sending the SMS message is correlated with the user receiving one or more of the different forms.

For an embodiment, the user-provided form and the one or more automatically generated variations of the user-provided form that have a greater number of sensed actions (reflecting success) by the sub-users are more likely to be adaptively selected. That is, for an embodiment, the form(s) that received none or the least number of sensed sub-user actions are dropped from the testing. For an embodiment, the forms having resulted in sensed actions as a result of being received by the sub-users are included or maintained in the testing.

For at least some embodiments each sub-user is a visitor of a website of the user. For an embodiment, the user is a merchant. For example, the sub-users may be customers of the user (merchant) who are visiting the website of the user (merchant) to purchase goods or services of the user (merchant). Upon the sub-user visiting the website, the sub-user is provided with a form. For an embodiment, the form includes the user-provided form and/or the automatically generated variations of the form. For an embodiment, actions of the sub-users upon receiving the forms are sensed, tracked, and/or monitored during testing of the forms. For an embodiment, the variations of the forms are adapted based on the testing. For an embodiment, the variations of the forms include different content or behavior. Accordingly, the sensed actions of the sub-users upon receiving the forms adaptively controls the variations of the forms displayed to the sub-users.

For an embodiment, the adaptively selecting which of the user-provided form and the one or more automatically generated variations of the user-provided form includes applying a multi-armed bandit process to sensed action of the sub-users. For an embodiment, the multi-armed bandit process includes a Thompson sampling algorithm. For an embodiment, the purpose of the adaptive behavior is to ensure the testing reduces uncertainty in the tested forms as much as possible, specifically reducing uncertainty for the forms that are the most likely to be "the best". The best being the form that is most successful in encouraging users to perform a target ("goal") action, such as submitting the form or following a provided link. For an embodiment, a specific case when this comes up is providing SMS subscription consent. "Click to subscribe" (maybe something else) is where a sub-user clicks on the form's link, the user is directed to their SMS app with a signup phone number and signup code filled out. The end goal is then for the user to send that SMS to finish subscribing to the merchant/user's SMS list.

For an embodiment, multi-armed bandit is a type of A/B testing that uses machine learning to learn from data gathered during the test to dynamically increase the visitor allocation in favor of better-performing variations. What this means is that variations that aren't good get less and less traffic allocation over time. For an embodiment, Multi-Armed Bandit (MAB) is a machine learning framework in which an agent has to select actions (arms) in order to maximize its cumulative reward in the long term.

Model of Website Visitor Actions

Figure 4:
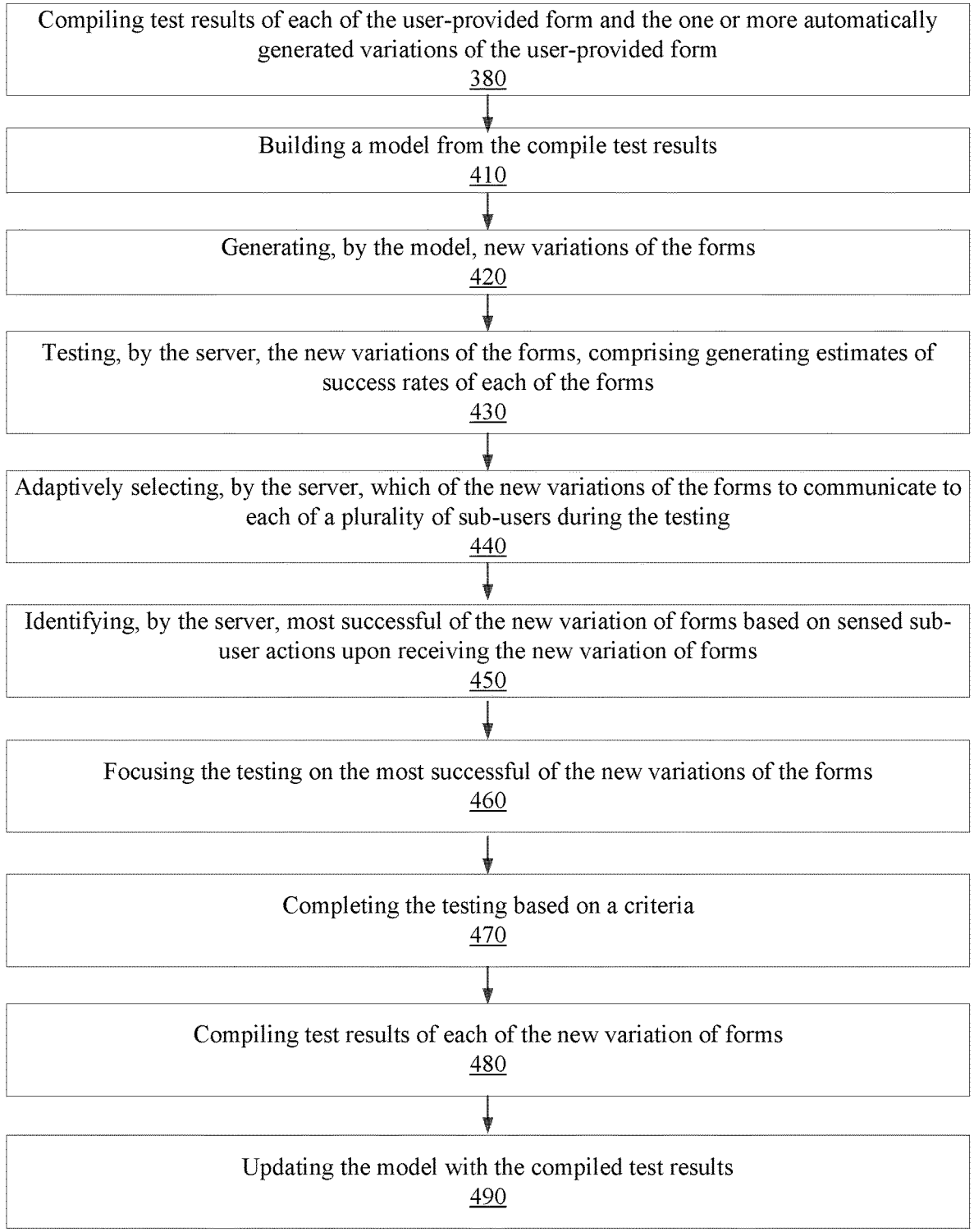
FIG. 4 is a flow chart that includes steps of a method for automated form generation, according to another embodiment.

FIG. 4 is a flow chart that includes steps of a method for automated form generation, according to another embodiment. The flow chart receives the eight step 380 of the flow chart of FIG. 3. That is, the compiled result test results of each of the user-provided form and the one or more automatically generated variations of the user-provided form proceed a first step 410 of building a model from the compiled test results. A second step 420 includes generating, by the model, new variations of the form. A third step 430 includes testing, by the server, the new variations of the forms, comprising generating estimates of the success rates of each of the new variations of the forms. A fourth step 440 includes adaptively selecting which of the new variations of the forms to communicate to each of the plurality of sub-users during the testing. For an embodiment, this includes electronically sending each of the new variations of the forms to the sub-users and then sensing actions of each of the sub-users in response to having received the new variations of the forms. A fifth step 450 includes identifying, by the server, the most successful variations of the forms based on the sensed sub-user actions upon receiving the new variations of the forms. A sixth step 460 includes focusing the testing on the most successful of the new variations of the forms. A seventh step 470 includes completing the testing based on a criteria, which may be one of the previously described criteria. An eight step 480 includes compiling results of the success rates of each of the new variations of the forms. A ninth step 490 includes updating the model based on the compiled test results of the success rates of each of the new variations of the forms. It is to be understood that the step of testing 430 can be performed through alternate embodiments.

Figure 5:
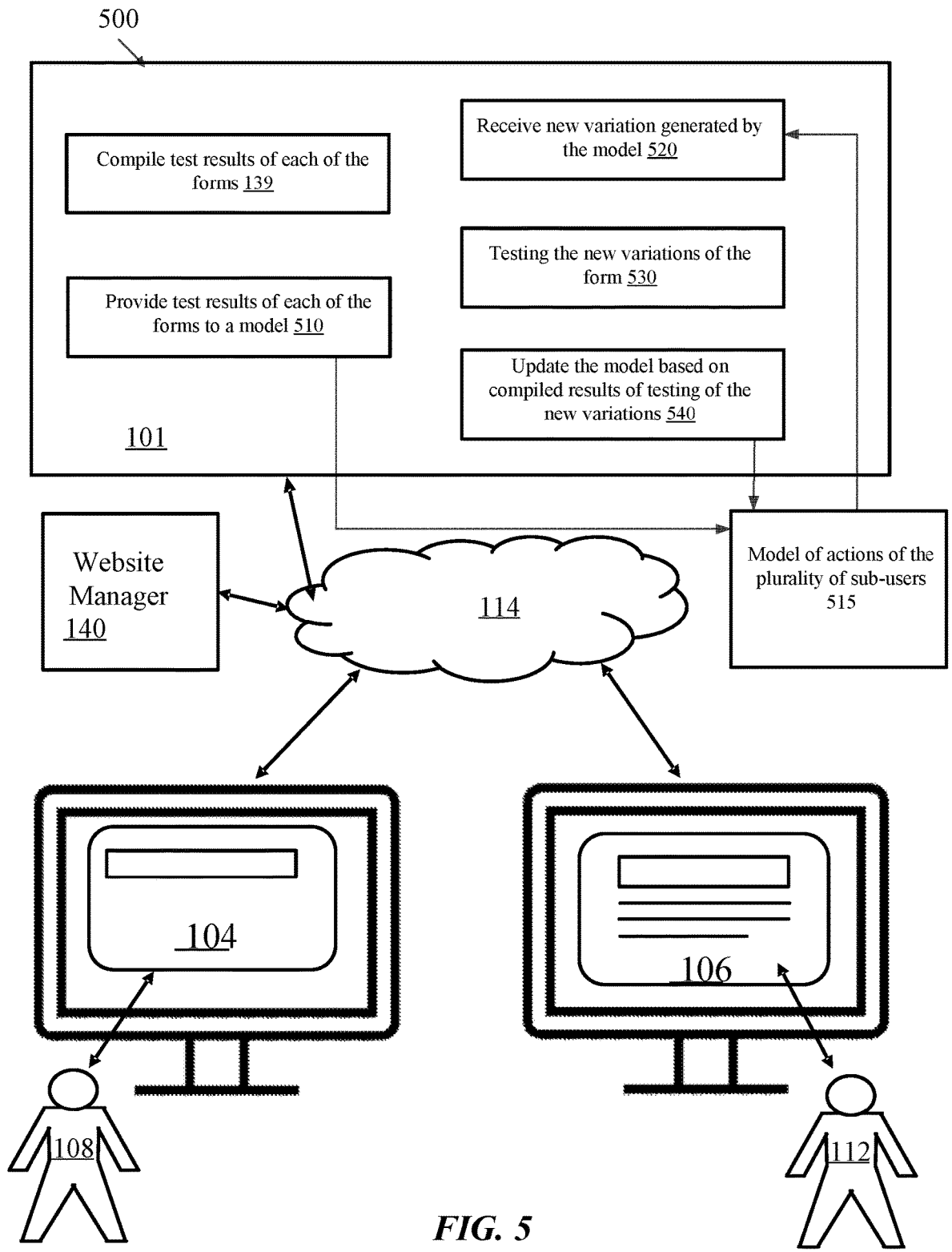
FIG. 5 shows a system for automated form generation that additionally includes a model of website visitor actions, according to an embodiment.

FIG. 5 shows a system for automated testing and selection of a template of an electronic form that additionally includes a model of website visitor actions, according to an embodiment. At least some embodiments further include providing 510 the test results of (the describe embodiments for testing) of the user-provided form and the one or more automatically generated variations to a model 515, wherein the model models actions of the website visitors that receive the variations of the form. For an embodiment, the model includes a Gaussian process. For an embodiment, the described model provides the benefit of allowing estimation of uncertainty in the form success rate for form variations not yet tested. Accordingly, the model may be used for the generation of more successful new variations of the user-provided form.

For at least some embodiments, the model models actions or "inputs" to those actions, such as the form time delay. For an embodiment, the form time delay includes a minimum time since loading the code/website that must pass before a user is shown the form. Further, the actions may additionally or alternatively include other display features as shown and described in FIGS. 2 and 7. It is to be understood that any combination of the display features can be utilized.

At least some embodiments further include generating, by the model, new variations of the user-provided form. The server 101 receives 520 the new variation generated by the model 515. For an embodiment, the new variations are based on the performance of "similar" variations that have been tested and modeled uncertainty or number of "similar" variations that have been tested.

At least some embodiments further include testing 530, by the server, the new variations of the user-provided form generated by the model, comprising generating estimates of success rates of each of the new variations of the user-provided form. For an embodiment, the testing may include a multi-armed bandit process as previously described, or the testing may include "standard" A/B testing, where the variations to be tested are shown equally at random (statically, not necessarily dynamically). For an embodiment, the testing includes sensing actions of the sub-users as previously described.

At least some embodiments further include updating 540 the model based on the compiled test results of each of the user-provided form and the new model-generated variations of the user-provided form. At least some embodiments further or additionally include using data recorded from the user-provided form during this test.

Figure 6:
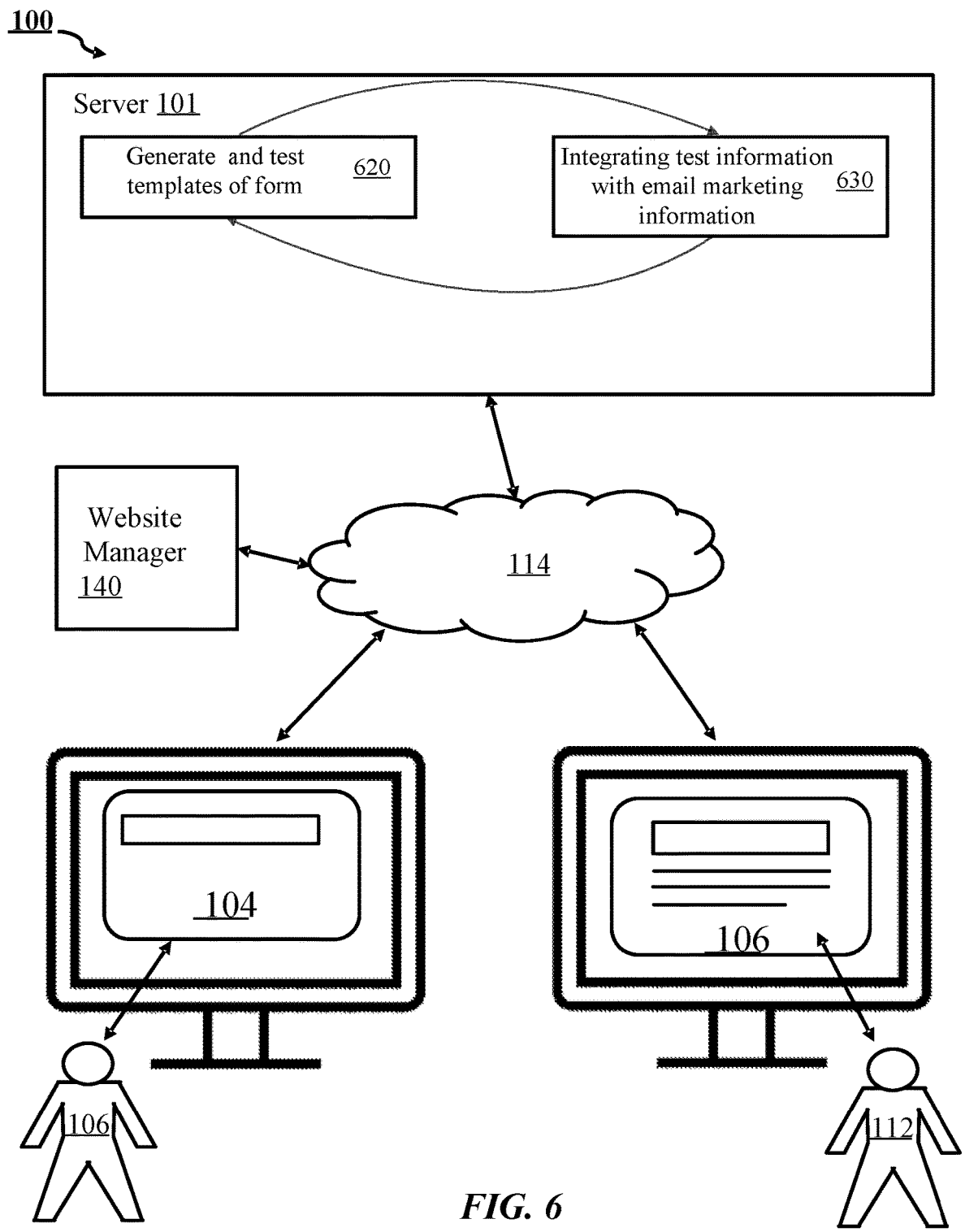
FIG. 6 shows a system that further includes integrating information received from the testing during automated form generation with electronic marketing information, according to an embodiment.

FIG. 6 shows a system that further includes integrating information received from the testing during automated form generation with electronic marketing information, according to an embodiment. For an embodiment, integrating the electronic marketing information includes using electronic marketing information to qualify the site visitors (sub-users). That is, for an embodiment, the electronic marketing information is used to target particular site visitors. For example, for an embodiment, templates are targeted to site visitors that have taken certain actions which have been tracked. That is, the forms in a particular test are only shown to site visitors who have clicked a specific email. This relates closely to the previously described qualification for views, and it is one potential reason for qualifying views of the site visitors.

For an embodiment, content or behavior of the forms is dynamically updated based on actions or characteristics of the sub-user. For example, different images of forms of the templates are displayed to the site visitors (sub-user) based on the last product that the site visitor browsed. Further, any of the previously described sensed, monitored, tracked actions of the sub-users can be used to influence the display of the forms.

For an embodiment, at least some of the test information determined during generation and testing of the forms 620 is used for influencing marketing information. For example, different coupons may be included with different tested templates (forms) to send emails with different discounts.

For an embodiment, integrating electronic marketing information 630 includes ensuring that participants (website visitors) in the test have all taken actions pertaining to other marketing actions. For example, the actions taken can include opening or clicking an email within the last X (such as, 7) days. For an embodiment, marketing information is used to qualify participants (site visitors).

For an embodiment, integrating electronic marketing information includes ensuring that different discount offers are present in different templates in the test. For example, this can include a 10% off discount for some templates versus free shipping for other templates that are delivered to the correct test participants though automated emails.

For an embodiment, integrating electronic marketing information includes counting the number of test participants who viewed one template in the test and carried out another action. For example, this can include counting the number of test participants that have purchased a product within the last next Y (for example 7) days.

Figure 7:
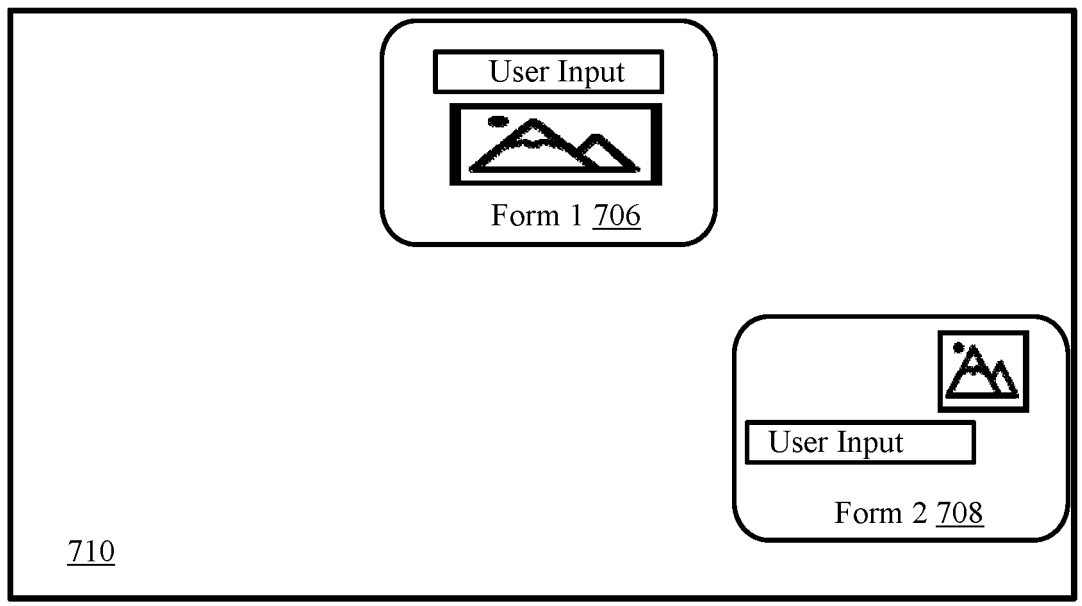
FIG. 7 shows templates of a form each having different content or behavior, according to an embodiment.
Figure 7:
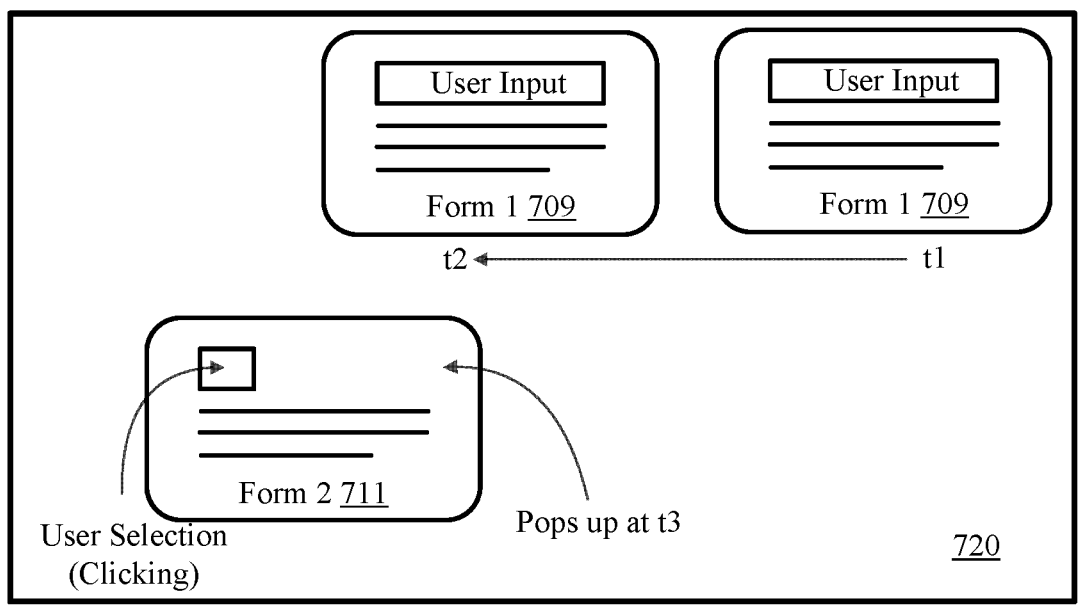

FIG. 7 shows forms each having different content or behavior, according to an embodiment. For an embodiment, the different content of the different forms includes at least visual representations of the form, including at least one of a size, a text, a layout, a design, colors, or images of the form. A first display 710 of the website includes examples of forms 706, 708 that have different layouts.

For an embodiment, the different behavior of the different forms includes presenting the forms in different ways to different website visitors (sub-users). As previously described, the templates of each of the forms can be used for controlling the behavior of the forms on a display of each of the sub-users. For an embodiment, this includes presenting the form in different colors. For an embodiment, this includes presenting the forms to the website visitors for different amounts of time. For an embodiment, this includes presenting the form over different portions (for example, ⅓ of the screen or different) of the website visitor's screen. For an embodiment, this includes at least a time or scroll delay before the form appears, an exit intent or lack thereof, a portion of a screen that the form appears on, or an appearance method (for example, the form pops up or slides out onto the screen). A second display 720 of the website includes a form 709 that moves from a first position on the display at time t1 to a second position on the display at time t2, and a form 711 that pops up on the display a period of time t3 after the webpage has been loaded.

An embodiment includes displaying the most successful form of the testing on the website of the user when the successful form is determined to have a statistical advantage over other forms of user-provided form and the variations of the user-provide form based on the success rates determined for each form during the testing.

At least some embodiments further include integrating information received from the testing with electronic marketing information. For an embodiment, the electronic marketing information includes one or more of site visitor actions, discount offers, and product purchases. For an embodiment, integrating information received from the testing with electronic marketing information comprises using electronic marketing information to qualify the site visitors for the testing, including ensuring that site visitors in the testing have all taken actions pertaining to other marketing actions. For an embodiment, integrating information received from the testing with electronic marketing information comprises dynamically updating content in the templates based on actions or characteristics of the user within the electronic marketing information. For an embodiment, integrating information received from the testing with electronic marketing information includes at least some of the test information determined during testing of the templates being used for influencing marketing information.

As previously described and shown in FIGS. 2 and 7, for an embodiment, the different content of the forms includes at least visual representations of the form, including at least one of a size, a text, a layout, a design, colors, or images of the form. Further, for an embodiment, the different behavior of the forms includes at least a time or scroll delay before the form appears, an exit intent or lack thereof, a portion of a screen that the form appears on, or an appearance method.

Although specific embodiments have been described and illustrated, the embodiments are not to be limited to the specific forms or arrangements of parts so described and illustrated. The described embodiments are to only be limited by the claims.

What is claimed:

1. A method of automated form generation, comprising:
receiving, by a server, a request from a user to improve a user-provided form, and receiving data associated with the user-provided form;
selecting, by the server, one or more automatically generated variations of the user-provided form, wherein the variations include at least a different behavior, wherein the different behavior of the automatically generated variations of the user-provided form includes different movements of the automatically generated variations of the user-provided form on a display of recipients of the automatically generated variations of the user-provided form;
testing, by the server, the user-provided form and the one or more automatically generated variations of the user-provided form, comprising generating estimates of success rates of each of the user-provided form and the one or more automatically generated variation of the form, comprising:
adaptively selecting, by the server, which of the user-provided form and the one or more automatically generated variations of the user-provided form to communicate to each of a plurality of sub-users during the testing, wherein each of the plurality of sub-users is a visitor of a website of the user, and wherein the user-provided form and the one or more automatically generated variations of the user-provided form are behaviorally distinct from the website, comprising:

electronically sending the user-provided form and the one or more automatically generated variations of the user-provided form to each of the plurality of sub-users;
sensing actions of the plurality of sub-users based on receiving the user-provided form and the one or more automatically generated variations of the user-provided form;
identifying, by the server, most successful of the user-provided form and the one or more automatically generated variations of the user-provided form based on sensed sub-user actions upon receiving the user-provided form and the one or more automatically generated variations of the user-provided form; and
focusing the testing on the most successful of the user-provided form and the one or more automatically generated variations of the user-provided form; and
completing the testing based on a criteria;
compiling estimates of success rates of each of the user-provided form and the one or more automatically generated variations of the user-provided form; and
electronically sending one or more selected forms of the user-provided form and the one or more automatically generated variations of the user-provided form to sub-users based on the compiled estimates of the success rates.

2. The method of claim 1, wherein the sensed sub-user actions based on receiving the user-provided form and the one or more automatically generated variations of the user-provided form comprises sensing selection by the sub-users at least portions of the user-provided form and the one or more automatically generated variations of the user-provided form.

3. The method of claim 1, wherein the different movements of the automatically generated variations of the user-provided form includes a timing of a changing position of the electronically sent automatically generated variations of the user-provided form.

4. The method of claim 1, wherein the sensed sub-user actions based on receiving the user-provided form and the one or more automatically generated variations of the user-provided form comprises sensing the sub-users sending an SMS (Short Message Service) message for subscribing to an SMS list of the user.

5. The method of claim 1, wherein the user-provided form and the one or more automatically generated variations of the user-provided form that have a greater number of sensed actions by the sub-users are adaptively selected at a higher rate.

6. The method of claim 1, wherein different movements of the automatically generated variations of the user-provided form includes a popup time of the electronically sent automatically generated variations of the user-provided form, wherein the popup time is a form delay which is a delay between when a sub-user performs an action on the website of the user and when the sub-user is displayed the electronically sent generated variations of the user-provided form.

7. The method of claim 1, wherein different movements of the automatically generated variations of the user-provided form includes different periods of time in which the variations of the user-provided form pops up on a display after the webpage has been loaded.

8. The method of claim 1, further comprising:
providing the test results of each of the user-provided form and the one or more automatically generated variations of the user-provided form to a model, wherein
the model models actions of the plurality of sub-users that receive the variations of the user-provided form;
generating, by the model, new variations of the user-provided form;
testing, by the server, the new variations of the user-provided form generated by the model, comprising generating estimates of success rates of each of the new variations of the user-provided form;
updating the model based on compiled test results of the user-provided form and each of the new variations of the user-provided form.

9. The method of claim 8, wherein the model includes a Gaussian process model that estimates form success rates for form variations not yet tested, thereby allowing estimation of uncertainty in a form success rate for form variations not yet tested, and generating more successful new variations of the user-provided form.

10. The method of claim 8, wherein the modeled action includes modeling actions of the sub-users based on a form time delay, wherein the form time delay is a time between when a sub-user accesses a website and when the sub-user is provided at least one of the user-provided form or the one or more automatically generated variations of the user-provided form.

11. The method of claim 8, wherein the modeled action includes modeling actions of the sub-users based on movement of the user-provided form and the one or more automatically generated variations of the user-provided form.

12. The method of claim 8, wherein modeling actions, by the model, of the plurality of sub-users that receive the variations of the user-provided form include modeling model the actions or inputs to the actions including a form time delay, wherein the form time delay includes a minimum time since loading the website that must pass before a sub-user is shown the form.

13. The method of claim 1 wherein different movements of the automatically generated variations of the user-provided form includes the automatically generated variations of the user-provided form moving from a first position on a display at time t1 to a second position on the display at time t2 differently.

14. The method of claim 1 wherein different movements of the automatically generated variations of the user-provided form includes presenting the automatically generated variations of the user-provided form to visitors of the website for different amounts of time.

15. A system for automated form generation, comprising:
a site manager configures to manage a website of a user;
a plurality of computing devices of a plurality of sub-users configured to visit the website of the user;
a server electronically connected to the site manager, and the plurality of computing devices, the server configured to:
receive a request from the user improve a user-provided form, and receiving data associated with the user-provided form;
select one or more automatically generated variations of the user-provided form, wherein the variations include at least a different behavior, wherein the different behavior of the automatically generated variations of the user-provided form includes different movements of the automatically generated variations of the user-provided form on a display of recipients of the automatically generated variations of the user-provided form;

test the user provided form and the one or more automatically generated variations of the form, comprising generating estimates of success rates of each of the user-provided form and the one or more automatically generated variation of the form, comprising:

adaptively selecting, by the server, which of the user-provided form and the one or more automatically generated variations of the user-provided form to communicate to each of a plurality of sub-users during the testing, wherein each of the plurality of sub-users is a visitor of a website of the user, and wherein the user-provided form and the one or more automatically generated variations of the user-provided form are behaviorally distinct from the website, comprising:

electronically sending the user-provided form and the one or more automatically generated variations of the user-provided form to each of the plurality of sub-users;

sensing actions of the plurality of sub-users based on receiving the user-provided form and the one or more automatically generated variations of the user-provided form;

identifying most successful of the user-provided form and the one or more automatically generated variations of the user-provided form based on sensed sub-user actions upon receiving the user-provided form and the one or more automatically generated variations of the user-provided form; and focusing the testing on the most successful of the user-provided form and the one or more automatically generated variations of the user-provided form; and completing the testing based on a criteria;

the server further operative to:

compile test results of each of the user-provided form and the one or more automatically generated variations of the user-provided form; and electronically send one or more selected forms of the user-provided form and the one or more automatically generated variations of the user-provided form based on the compiled test results.

16. The system of claim 15, wherein the sensed sub-user actions based on receiving the user-provided form and the one or more automatically generated variations of the user-provided form comprises sensing selection by the sub-users at least portions of the user-provided form and or one or more automatically generated variations of the user-provided form.

17. The system of claim 15, wherein the sensed sub-user actions based on receiving the user-provided form and the one or more automatically generated variations of the user-provided form comprises sensing the sub-users sending an SMS (Short Message Service) message for subscribing to an SMS list of the user.

18. The system of claim 15, the server is further configured to:

provide the test results of each of the user-provided form and the one or more automatically generated variations of the user-provided form to a model, wherein the model models actions of the plurality of sub-users that receive the variations of the form.

19. The system of claim 17, wherein the modeled action includes modeling actions of the sub-users based on a form time delay, wherein the form time delay is a time between when a sub-user accesses a website and when the sub-user is provided at least one of the user-provided form or the one or more automatically generated variations of the user-provided form.

20. The method of claim 1, wherein different behavior of the automatically generated variations of the user-provided form additionally includes the automatically generated variations of the user-provided form being presented in different colors.

* * * * *